(12) United States Patent
Pineault

(10) Patent No.: US 12,076,793 B2
(45) Date of Patent: Sep. 3, 2024

(54) TOOL PART ATTACHMENT ASSEMBLY, TOOL PART CONNECTOR AND TOOL ASSEMBLY

(71) Applicant: 9359-0602 QUEBEC INC., Chicoutimi (CA)

(72) Inventor: Louis-Philippe Pineault, Chicoutimi (CA)

(73) Assignee: 9359-0602 QUEBEC INC., Chicoutimi (CA)

( * ) Notice: Subject to any disclaimer, the term of this patent is extended or adjusted under 35 U.S.C. 154(b) by 118 days.

(21) Appl. No.: 17/582,456

(22) Filed: Jan. 24, 2022

(65) Prior Publication Data

US 2022/0250166 A1 Aug. 11, 2022

Related U.S. Application Data

(60) Provisional application No. 63/148,398, filed on Feb. 11, 2021.

(51) Int. Cl.
*B23B 31/16* (2006.01)
*B23B 45/00* (2006.01)
*B25H 3/00* (2006.01)

(52) U.S. Cl.
CPC ...... *B23B 31/16275* (2013.01); *B23B 45/003* (2013.01); *B25H 3/003* (2013.01)

(58) Field of Classification Search
CPC .. B23B 45/003; B23B 31/16275; B25H 3/003
(Continued)

(56) References Cited

U.S. PATENT DOCUMENTS

| 4,818,157 A | 4/1989 | Kouvelis |
| 5,417,527 A | 5/1995 | Wienhold |

(Continued)

FOREIGN PATENT DOCUMENTS

| CA | 2061591 C | 8/1992 |
| CA | 2257065 | 8/1997 |

(Continued)

OTHER PUBLICATIONS

English translation of abstract for CN104668618 retrieved from Espacenet on Jan. 19, 2022.
(Continued)

*Primary Examiner* — Robert F Long
*Assistant Examiner* — Xavier A Madison
(74) *Attorney, Agent, or Firm* — BCF LLP

(57) ABSTRACT

A tool part attachment assembly for a tool is disclosed. The tool part attachment assembly has a tool part connector and a line. The tool part connector, which is configured for selectively retaining a tool part, has first and second parts and rolling elements disposed radially therebetween. The first part defines a connecting aperture configured to receive a portion of the tool part, is rotationally fixed relative to the tool part when the tool part is received in the connecting aperture, and is disposed inside the second part. The second part is rotationally connected to the first part. The line has a first end connected to the tool part connector, and a second end. In response to the tool part rotating, the first part rotates with the tool part relative to the second part. A tool part connector and a tool assembly are also disclosed.

15 Claims, 15 Drawing Sheets

(58) Field of Classification Search
USPC .......................................................... 173/210
See application file for complete search history.

(56) References Cited

U.S. PATENT DOCUMENTS

| | | |
|---|---|---|
| 5,678,961 A | 10/1997 | Fleege |
| 5,722,805 A | 3/1998 | Giffin |
| 5,951,026 A | 9/1999 | Harman, Jr. et al. |
| 6,053,675 A | 4/2000 | Holland et al. |
| 6,074,140 A | 6/2000 | Cook |
| 6,079,716 A | 6/2000 | Harman, Jr. et al. |
| 7,334,970 B2 | 2/2008 | Kozak |
| 7,354,230 B2 | 4/2008 | Bauman |
| 7,367,757 B2 | 5/2008 | Phillips |
| 7,469,909 B2 | 12/2008 | Strauch et al. |
| 7,565,854 B2 | 7/2009 | Chiang et al. |
| 8,132,990 B2 | 3/2012 | Bauman |
| 8,308,168 B2 | 11/2012 | Nash |
| 8,567,291 B2 * | 10/2013 | Moreau .................. B25G 1/105 81/184 |
| 8,622,667 B1 | 1/2014 | Seay |
| 9,227,309 B2 | 1/2016 | Moss et al. |
| 9,421,681 B2 | 8/2016 | Zhang et al. |
| 9,833,884 B2 | 12/2017 | Andriolo et al. |
| 10,195,733 B2 | 2/2019 | Jannitto, Jr. et al. |
| 10,219,610 B1 | 3/2019 | Henkel |
| 10,442,009 B2 | 10/2019 | Sergyeyenko et al. |
| 10,524,546 B2 | 1/2020 | Votel et al. |
| 10,596,693 B2 | 3/2020 | Vasudeva |
| 10,688,644 B2 | 6/2020 | Iida et al. |
| 2016/0128455 A1 * | 5/2016 | Moreau .................. B25H 3/00 24/3.13 |
| 2017/0282352 A1 | 10/2017 | Brull |
| 2018/0343991 A1 | 12/2018 | Olson |
| 2020/0086462 A1 | 3/2020 | Miley et al. |
| 2022/0024024 A1 * | 1/2022 | Garant ...................... B25F 5/02 |
| 2022/0288769 A1 * | 9/2022 | Zolno .................... B25H 3/003 |

FOREIGN PATENT DOCUMENTS

| | | |
|---|---|---|
| CA | 2346458 A1 | 4/2000 |
| CA | 2408711 A1 | 4/2003 |
| CA | 2585725 A1 | 10/2007 |
| CA | 2892957 A1 | 1/2013 |
| CA | 2810878 A1 | 9/2013 |
| CA | 2982328 A1 | 1/2016 |
| CA | 3042017 A1 | 5/2017 |
| CA | 3014602 A1 | 9/2017 |
| CA | 2878179 C | 1/2018 |
| CA | 2877912 C | 3/2019 |
| CA | 2970486 C | 4/2019 |
| CN | 104668618 A | 6/2015 |
| CN | 110614603 A | 12/2019 |
| CN | 110640667 A | 1/2020 |
| DE | 3938244 A1 | 5/1991 |
| DE | 10219418 B4 | 11/2014 |
| KR | 101653561 B1 | 9/2016 |

OTHER PUBLICATIONS

English translation of abstract for CN110614603 retrieved from Espacenet on Jan. 19, 2022.
English translation of abstract for CN110640667 retrieved from Espacenet on Jan. 19, 2022.
English translation of abstract for DE3938244 retrieved from Espacenet on Jan. 19, 2022.
English translation of abstract for DE10219418 retrieved from Espacenet on Jan. 19, 2022.
English translation of abstract for KR101653561 retrieved from Espacenet on Jan. 19, 2022.

* cited by examiner

US 12,076,793 B2

TOOL PART ATTACHMENT ASSEMBLY, TOOL PART CONNECTOR AND TOOL ASSEMBLY

CROSS-REFERENCE

The present application claims priority to U.S. Provisional Patent Application No. 63/148,398, filed Feb. 11, 2021 entitled "Drill Bit Attachment Assembly, Drill Bit Connector and Drill Bit Assembly", which is incorporated by reference herein in its entirety.

TECHNOLOGICAL FIELD

The present technology relates to tool part attachment assemblies, tool part connectors and tool assemblies.

BACKGROUND

Tools are used for a variety of reasons such as to make holes and/or to drive fasteners. In order for one tool to be able to drill holes and/or drive fasteners of various sizes and/or accommodate for various fastener heads, parts such as drill bits, screwdriver bits and/or power bits are generally removably connected to the tool.

Conventionally, tool parts such as tool bits are connected to a tool by inserting a tool bit in a chuck of a tool. Then, in some instances, the chuck is tightened. In some instances, tool bits can be dropped during the tool bit changing process. In addition, storing tool bits after removing them from the chuck can be difficult in certain situations. Likewise, when various tools are needed, for instance, to accommodate for various fastener heads, storing the various tools can be difficult in certain situations.

In view of the foregoing, there is a desire for a product that addresses at least some of these drawbacks.

SUMMARY

It is an object of the present technology to ameliorate at least some of the inconveniences present in the prior art.

According to one aspect of the present technology, there is provided a tool part attachment assembly for a tool. The tool part attachment assembly has a tool part connector and a line. The tool part connector is configured for selectively retaining a tool part. The tool part connector has a first a part, a second part and a plurality of rolling element disposed radially between the first and second parts. The first part defines a connecting aperture configured to receive a portion of the tool part, is rotationally fixed relative to the tool part when the tool part is received in the connecting aperture and is disposed inside the second part. The second part is rotationally connected to the first part. The line has a first end connected to the tool part connector, and a second end. In response to the tool part rotating, the first part rotates with the tool part relative to the second part.

In some embodiments, the tool part attachment assembly also has a bearing having the plurality of rolling elements. The bearing is disposed radially between the first part and the second part, and rotationally connects the first part to the second part.

In some embodiments, the bearing is a ball bearing.

In some embodiments, the second part has a housing portion defining a recess configured to receive the first part and the bearing therein.

In some embodiments, a retainer is received in the recess and is configured to retain the first part and the bearing within the recess.

In some embodiments, the retainer is made of elastic material.

In some embodiments, the bearing has an inner race rotationally fixed to the first part, and an outer race rotationally fixed to the second part, and in response to the tool part rotating, the inner race rotates with the first part and the tool part such that the inner race, the first part and the tool part rotate relative to the second part.

In some embodiments, the second part defines a retaining tab connected to the first end of the line.

In some embodiments, the retaining tab defines a retaining tab aperture configured for connecting the first end of the line to the retaining tab.

In some embodiments, the second end of the line is configured for connection to at least one of: a handle grip of the tool for connecting the tool part attachment assembly and the tool part to the tool, and a holding member for connecting the tool part attachment assembly and the tool part to the holding member.

In some embodiments, the connecting aperture has a hexagonal shape.

According to another aspect of the present technology, there is provided a tool part connector for a tool configured for selectively retaining a tool part. The tool part connector has a first part, a second part and a plurality of rolling elements disposed radially between the first and second parts. The first part defines a connecting aperture configured to receive a portion of the tool part, is rotationally fixed relative to the tool part when the tool part is received in the connecting aperture, and is disposed inside the second part. The second part is rotationally connected to the first part. In response to the tool part rotating, the first part rotates with the tool part relative to the second part.

In some embodiments, the tool part connector also has a bearing having the plurality of rolling elements. The bearing is disposed radially between the first part and the second part, and rotationally connects the first part to the second part.

In some embodiments, the bearing is a ball bearing.

In some embodiments, the second part has a housing portion defining a recess configured to receive the first part and the bearing therein.

In some embodiments, the retainer is received in the recess and is configured to retain the first part and the bearing within the recess.

In some embodiments, the retainer is made of elastic material.

In some embodiments, the bearing has an inner race rotationally fixed to the first part, and an outer race rotationally fixed to the second part, and in response to the tool part rotating, the inner race rotates with the first part and the tool part such that the inner race, the first part and the tool part rotate relative to the second part.

In some embodiments, the second part defines a retaining tab connectable to a first end of a line.

In some embodiments, the retaining tab defines a retaining tab aperture configured for connecting the first end of the line to the retaining tab.

In some embodiments, the connecting aperture has a hexagonal shape.

According to another aspect of the present technology, there is provided a tool assembly having a tool, at least one tool bit and at least one tool bit attachment assembly. The tool has a handle grip and a chuck. The at least one tool bit is operatively selectively connected to the chuck. The at least one tool bit attachment assembly is connected to the at least one tool bit, the at least one tool bit attachment assembly has a tool bit connector and a line. The tool bit connector selectively retains the at least one tool bit, and has a first part, a second part and a plurality of rolling elements disposed between the first and second parts. The first part defines a connecting aperture that receives a portion of the at least one tool bit and the first part is rotationally fixed relative to the at least one tool bit. The first part is disposed inside the second part. The second part is rotationally connected to the first part. The line has a first end connected to the tool bit connector, and a second end. In response to the at least one tool bit rotating with the chuck, the first part rotates with the at least one tool bit relative to the second part.

In some embodiments, the tool bit connector also has a bearing having the plurality of rolling elements. The bearing is disposed radially between the first part and the second part, and rotationally connects the first part to the second part.

In some embodiments, wherein the bearing is a ball bearing.

In some embodiments, the second part has a housing portion defining a recess configured to receive the first part and the bearing therein.

In some embodiments, the retainer is received in the recess and is configured to retain the first part and the bearing within the recess.

In some embodiments, the retainer is made of elastic material.

In some embodiments, the bearing has an inner race rotationally fixed to the first part, and an outer race rotationally fixed to the second part, and in response to the tool bit rotating, the inner race rotates with the first part and the tool bit such that the inner race, the first part and the tool bit rotate relative to the second part.

In some embodiments, the second part defines a retaining tab connected to the first end of the line.

In some embodiments, the retaining tab defines a retaining tab aperture configured for connecting the first end of the line to the retaining tab.

In some embodiments, the connecting aperture has a hexagonal shape.

In some embodiments, the second end of the line is connected to the handle grip, thereby connecting the at least one tool bit attachment assembly and the at least one tool bit to the tool.

In some embodiments, the at least one tool bit attachment assembly is spaced from the chuck when the at least one tool bit is operatively connected to the chuck.

In some embodiments, the at least one tool bit is at least two tool bits and the at least one tool bit attachment assembly is at least two tool bit attachment assemblies. Each one of the at least two tools bits is connected to a corresponding one of the at least two tool bit attachments assemblies. One of the at least two tool bits is connected to the chuck, and the other of the at least two tool bits are connected to and hang from the handle grip by the line of the corresponding tool bit attachment assembly.

For purposes of the present application, terms related to spatial orientation when referring to a tool and components in relation to the tool, such as "left", "right", "top" and "bottom", are as they would be understood by an operator of the tool when a tool part connected to a chuck of the tool is horizontal.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
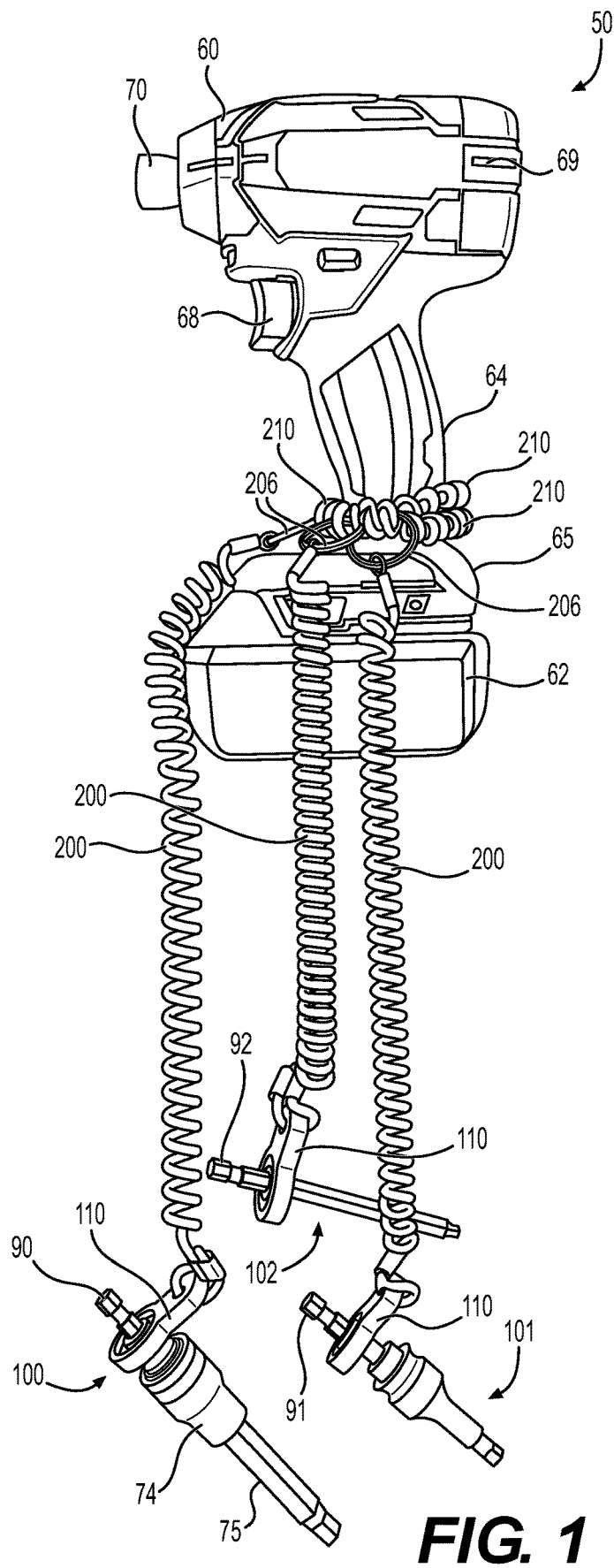
FIG. 1 is a perspective view taken from a bottom, left side of a drill assembly.

A tool assembly 50 having a tool 60, three tool parts 90, 91, 92 and three tool part attachment assemblies 100, 101, 102 in accordance with an embodiment of the present technology is shown in FIGS. 1, 2, 3, 4A and 4B. In the accompanying Figures, the tool 60 is a power tool and the tool parts are tool bits. More precisely, the tool 60 is a drill 60. Thus, the tool assembly 50 is a drill assembly 50, the three tool bits 90, 91, 92 are drill bits 90, 91, 92 and the three tool part attachment assemblies 100, 101, 102 are drill bit attachment assemblies 100, 101, 102. Although, the present description describes the present technology with reference to a drill, it is understood that other tools including power tools such as impact drivers and hand tools such as screwdrivers fall in the scope of the present technology. For instance, it is contemplated that in some embodiments, the tool 60 could be a screwdriver, the tool part 90 could be a screwdriver shank, and the tool part attachment assembly 100 could be a shank attachment assembly 100.

The drill bit attachment assemblies 100, 101, 102 each have a drill bit connector 110 that is connected to one of the corresponding drill bits 90, 91, 92, and a bungee cord 200 that connects the drill bit connector 110 to the drill 60. It is contemplated that the drill assembly 50 could have only one, two or more than three drill bit attachment assemblies, with a corresponding number of drill bits.

Referring to FIG. 1, the drill 60, which has a battery 62 with a flat bottom surface such that the drill 60 is stable when resting in an upright position. It is contemplated that in other embodiments, the drill 60 could be a wired drill. The drill 60 also has a handle grip 64 that extends above the battery 62, and that has a lower portion 65 that is wider than the remaining of the handle grip 64. The drill 60 has a control trigger 68 operatively connected to a motor (not shown) which is housed in a motor housing 69. The motor housing 69 is connected to an upper portion of the handle grip 64. The drill 60 also has a chuck 70 that is operatively connected to the motor. As such, when the control trigger 68 is operated, the motor is actuated which results in the chuck 70 rotating.

Figure 2:
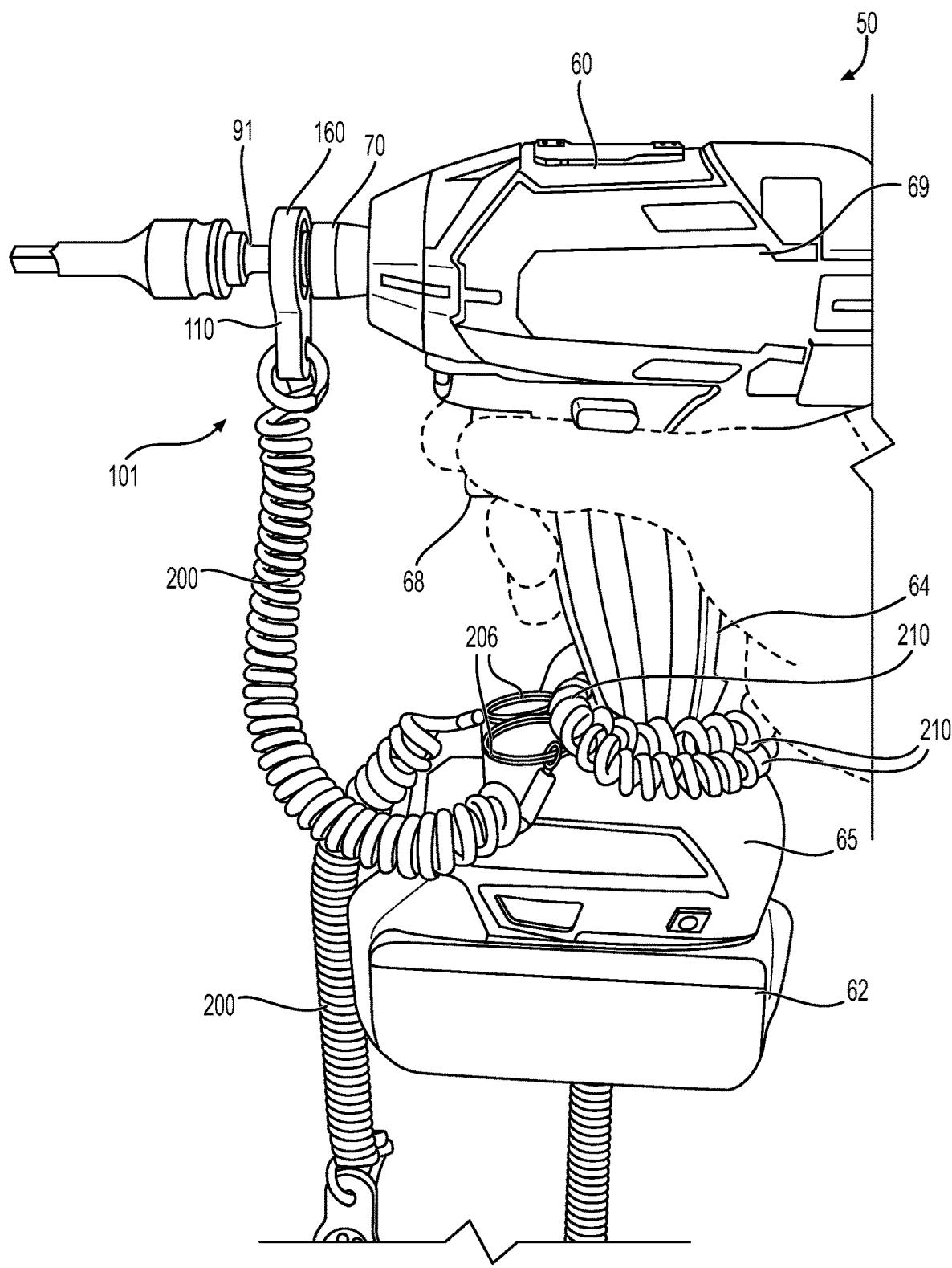
FIG. 2 is a perspective view taken from a top, left side of the drill assembly of FIG. 1, with a drill bit being operatively connected to a drill.
Figure 3:
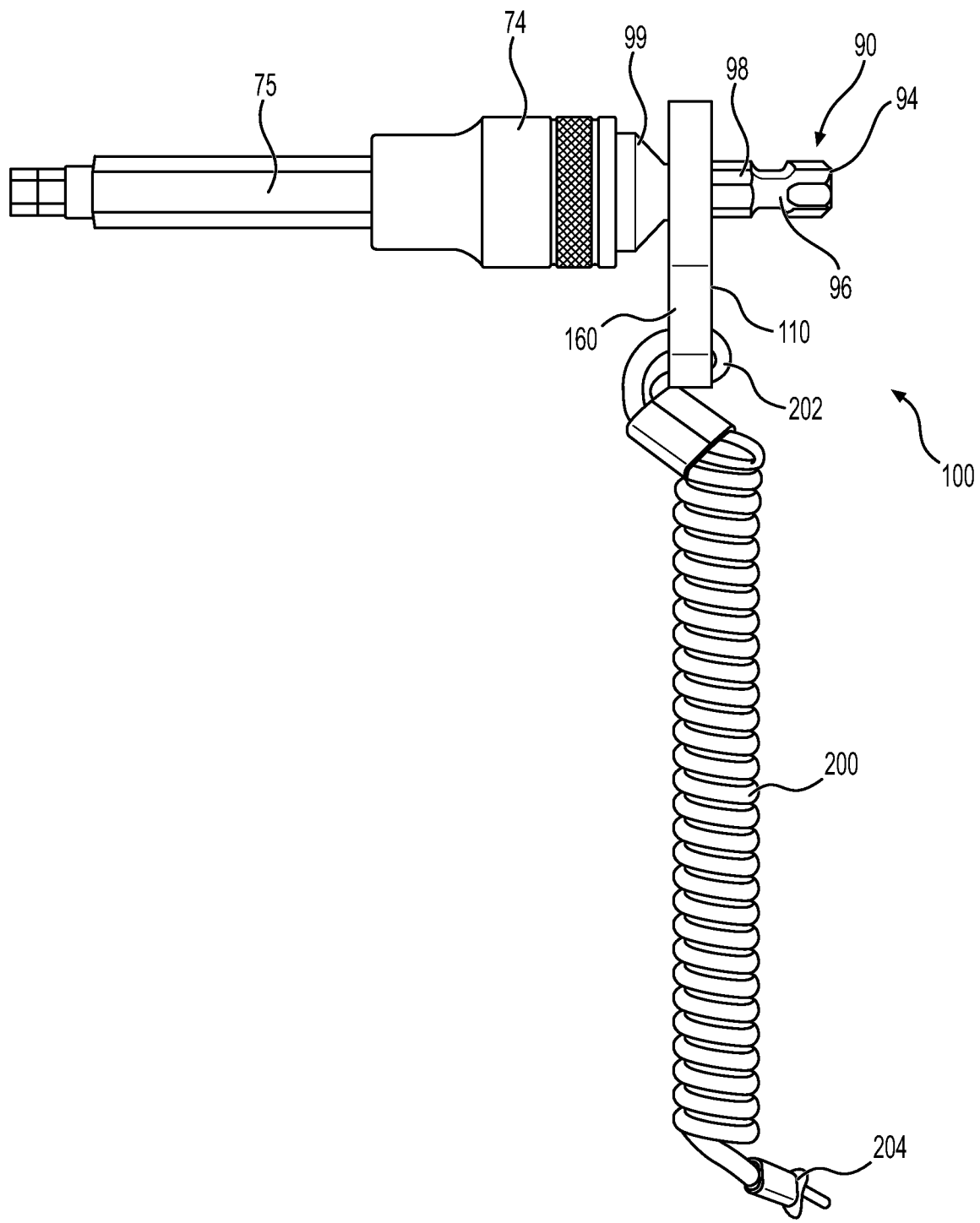
FIG. 3 is a left side elevation view of the drill bit of FIG. 2 connected to a drill bit attachment assembly of the drill assembly of FIG. 1.

Referring to FIGS. 1 to 3, the three drill bits 90, 91, 92 are configured to be selectively received in and selectively operatively connected to the chuck 70. Each of the drill bits 90, 91, 92 has a shank 94, a neck 96, a body 98 and a head 99. The shank 94 is configured to be received in the chuck 70. The neck 96 extends between the shank 94 and the body 98, and the body 98 extends between the neck 96 and the head 99. In the present embodiment, the shank 94 and the body 98 have a hexagonal shape. The head 99 is configured to engage with a fastener. In FIG. 3, the drill bit 90 is connected to a hex socket 74, which is in turn connected to a driving bit 75. It is contemplated that in other embodiments, the head 99 could be configured to drill a hole. As such, it is contemplated that the drill bits could be driving bits or drilling bits. For purposes of the present application, drill bit adaptors that can be connected to the chuck 70 of the drill 60, such as component 90 described above, are also considered as drill bits.

The drill bit attachment assembly 100 is connected to the drill bit 90, the drill bit attachment assembly 101 is connected to the drill bit 91, and the drill bit attachment assembly 102 is connected to the drill bit 92. As the drill bit attachment assemblies 100, 101, 102 are similar, only the drill bit attachment assembly 100 will be described in detail below.

The drill bit attachment assembly 100 includes the drill bit connector 110, which selectively retains the drill bit 90, and the bungee cord 200, which connects the drill bit connector 110, and thus the drill bit 90, to the drill 60.

Figure 4A:
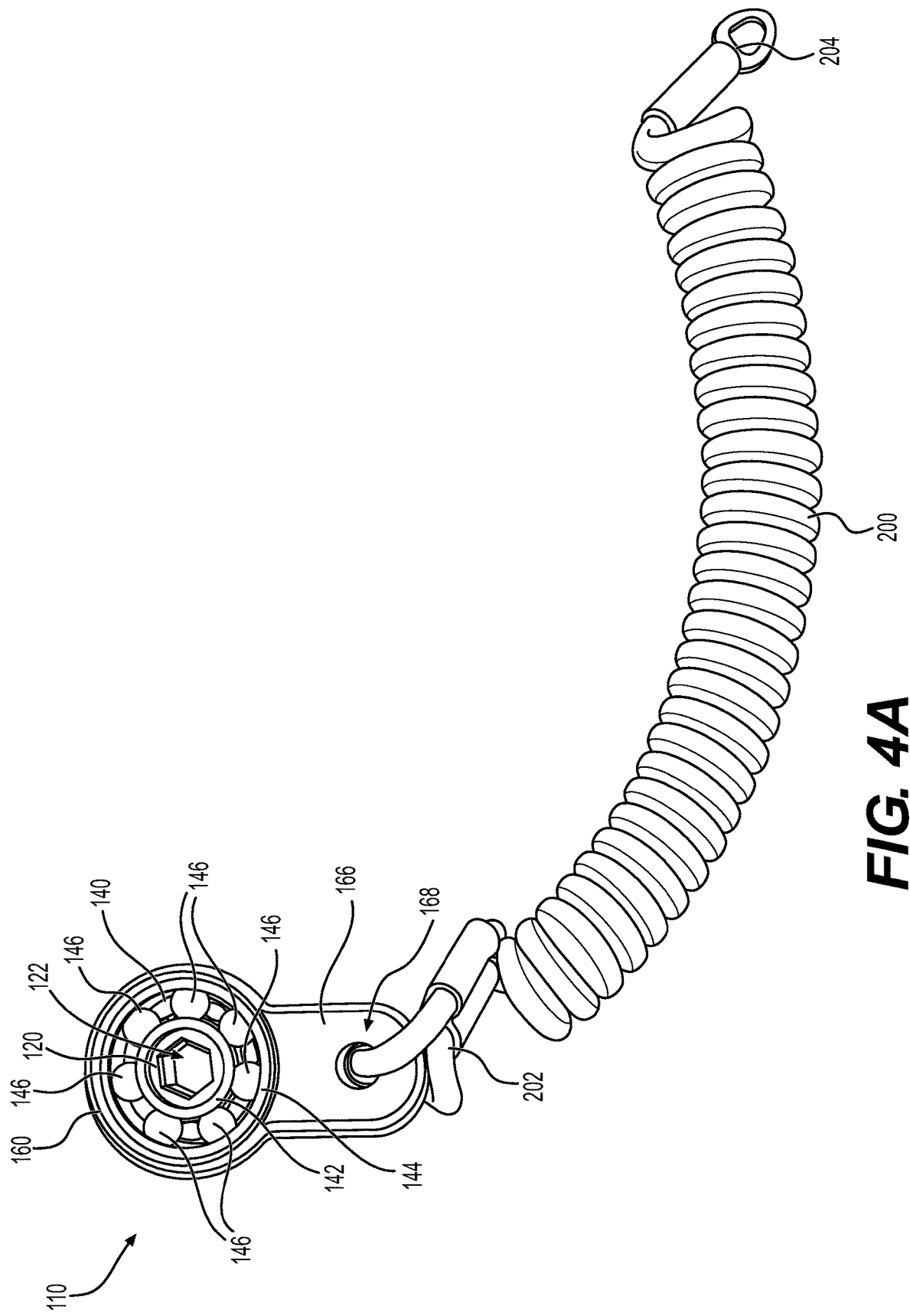
FIG. 4A is a perspective view taken from a bottom, rear side of the drill bit attachment assembly of FIG. 3.
Figure 4B:
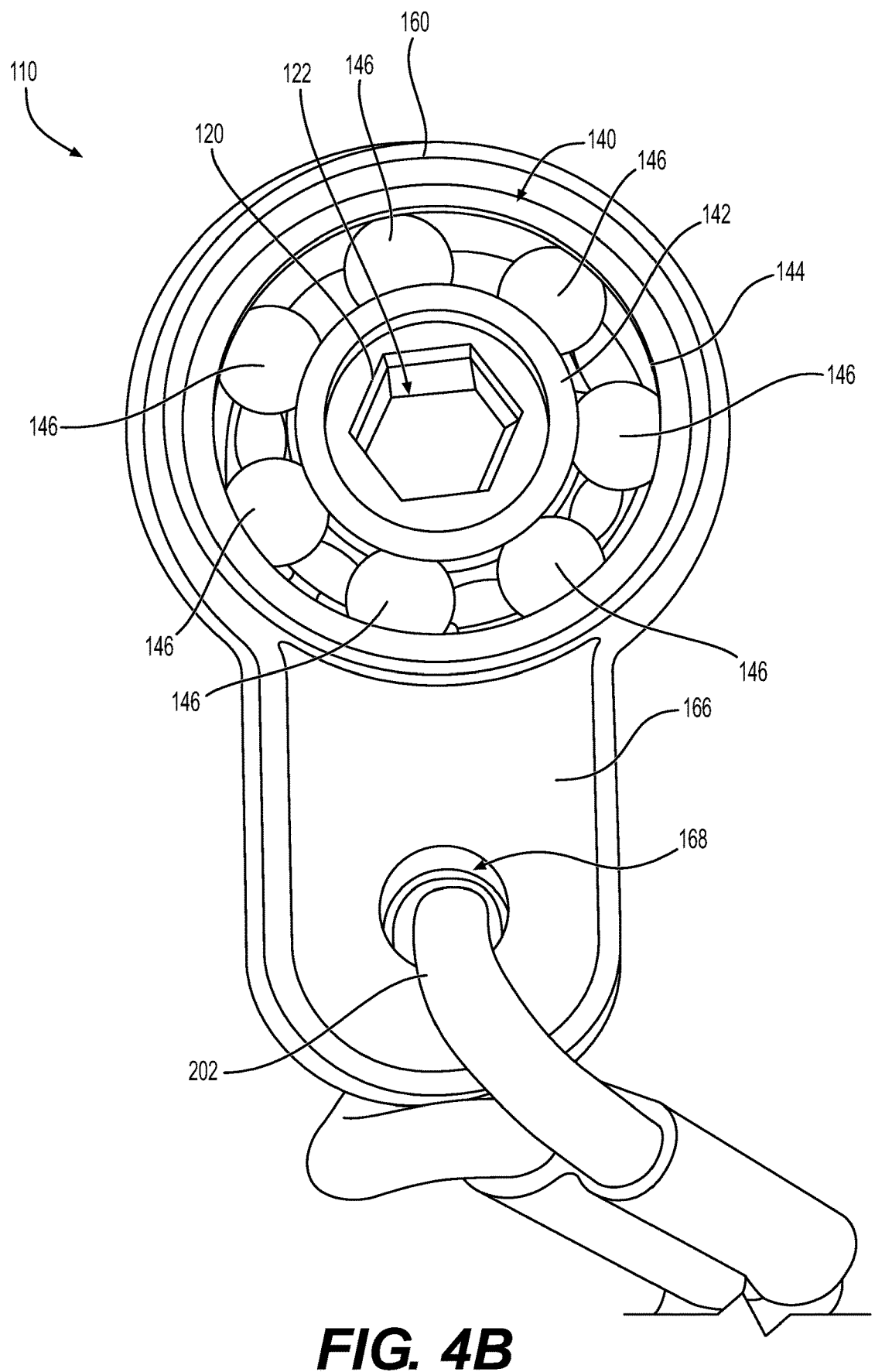
FIG. 4B is a close-up view of a drill bit connector of the drill bit attachment assembly of FIG. 3.

With reference to FIGS. 4A and 4B, the drill bit connector 110 has an inner part 120, an outer part 160, and a ball bearing 140 disposed radially between the inner and outer parts 120, 160. The inner part 120 is disposed inside the ball bearing 140, and the ball bearing 140 is disposed inside the outer part 160, such that the inner part 120 is rotationally connected to, and disposed inside, the outer part 160. It is contemplated that in some embodiments, the drill bit connector 110 could be disassembled such that the inner part 120 could be removed from the ball bearing 140, and that the ball bearing 140 could be removed from the outer part 160.

As will be described below, in some embodiments, the ball bearing 140 could be omitted and replaced with rolling elements.

Figure 5:
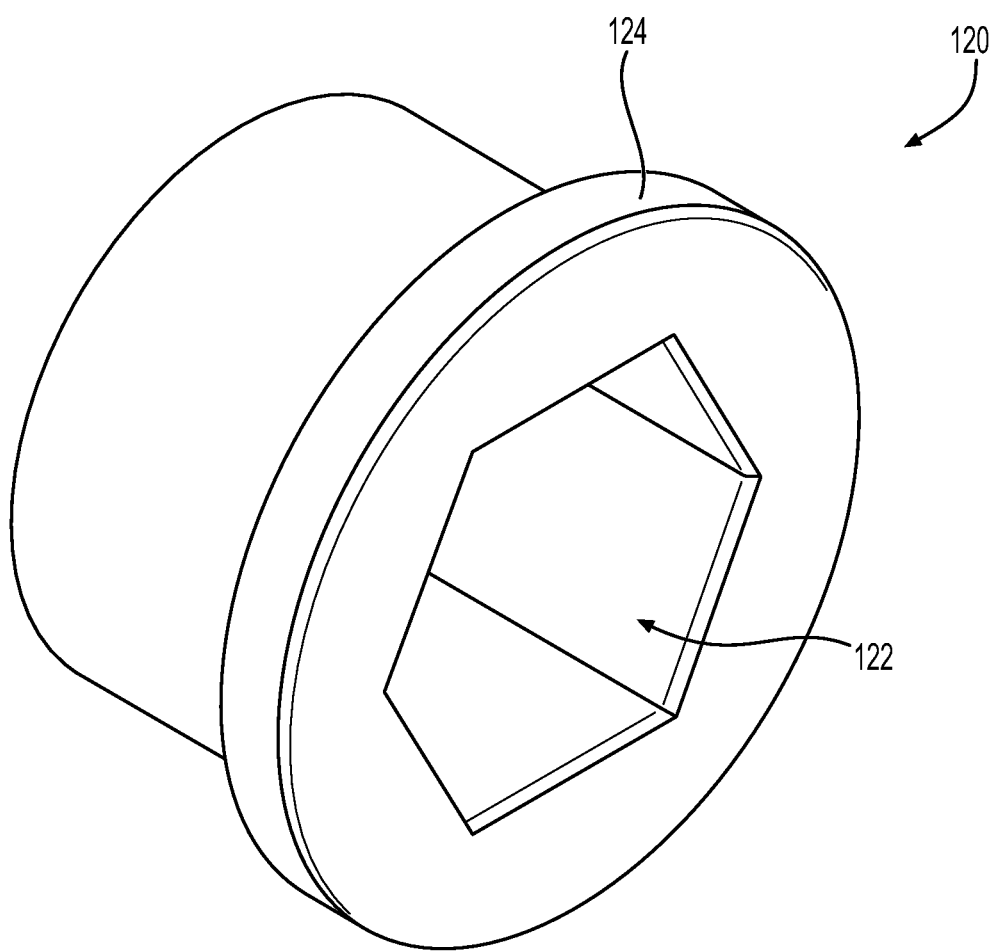
FIG. 5 is a perspective view taken from a top, front, right side of an inner part of the drill bit connector of FIG. 4B.

Referring to FIGS. 4A, 4B and 5, the inner part 120 defines a connecting aperture 122 configured to receive the shank 94, the neck 96 and a portion of the body 98 of the drill bit 90 therein. As the shank 94 and the body 98 have a hexagonal shape, the connecting aperture 122 also has a hexagonal shape. It is contemplated that in other embodiments, the connecting aperture 122 could have another shape complimentary to the shape of the shank and/or the body 98 of another drill bit. It is contemplated that the inner part could be provided with a coating, such as a polyurethane coating for example, to improve the grip between the inner part 120 and the drill bit 90. As will be described in greater detail below, once the drill bit 90 is received in the connecting aperture 122, the inner part 120 is rotationally fixed relative to the drill bit 90. The inner part 120 also has a radially extending collar 124 (seen in FIG. 5).

The ball bearing 140 has an inner race 142, an outer race 144 and a plurality of rolling elements 146 disposed radially between the inner and outer race 142, 144, and thus radially between the inner and outer parts 120, 160. There are seven rolling elements 146. It is contemplated that in other embodiments, there could be more or less than seven rolling elements 146. The inner race 142 is rotationally fixed to the inner part 120, and the outer race 144 is rotationally fixed to the outer part 160, thereby rotationally connecting the inner part 120 to the outer part 160. The collar 124 of the inner part 120 abuts a side of the inner race 142. It is contemplated that in some embodiments, the ball bearing 140 could be another type of bearing such as roller bearing. In some embodiments, the ball bearing 140 could be omitted. In such embodiments, rolling elements 146 could be disposed between the inner and outer parts 120, 160. It is contemplated that in other embodiments, the inner race 142 could be integrally formed with the inner part 120 and the outer race 144 could be integrally formed with the outer part 160.

Figure 6:
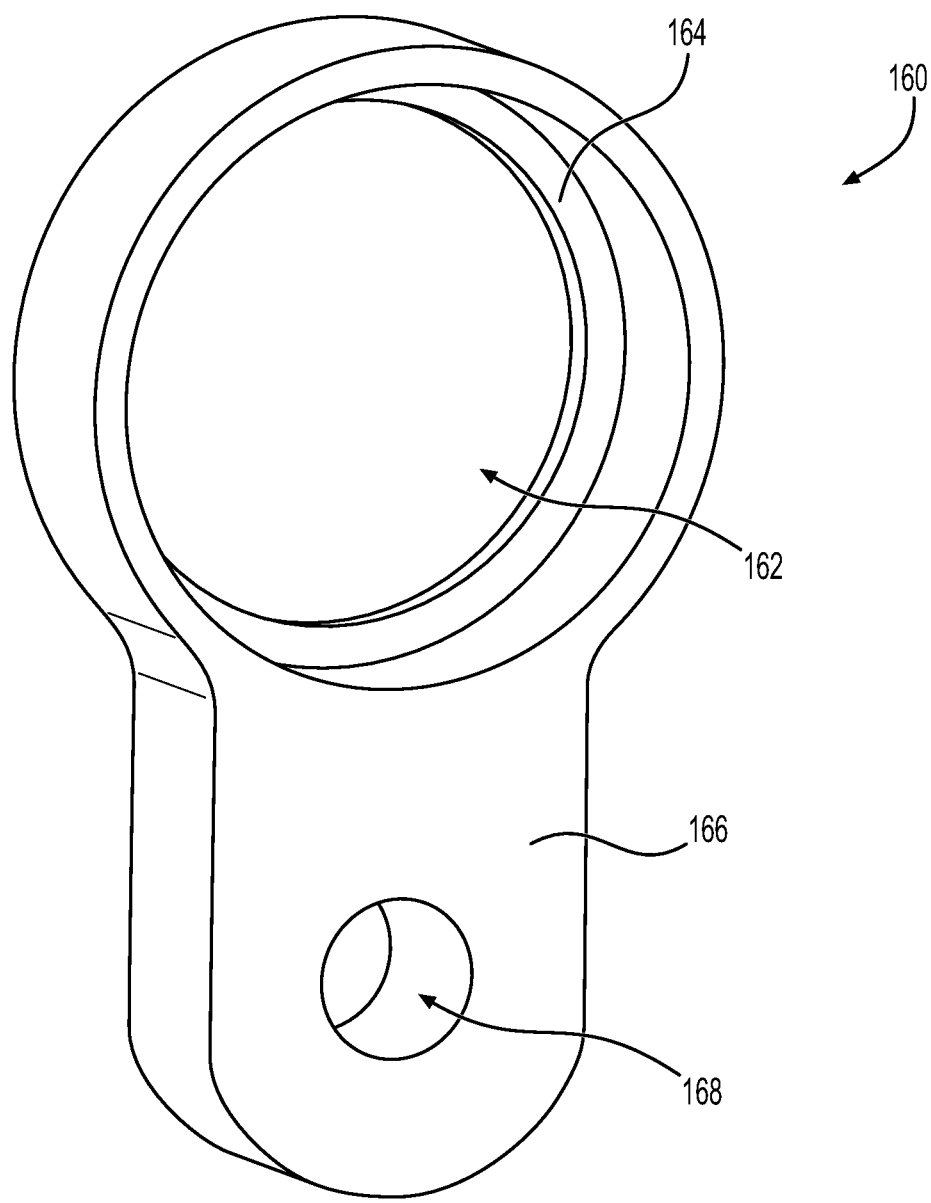
FIG. 6 is a perspective view taken from a top, rear, left side of an outer part of the drill bit connector of FIG. 4B.

Referring to FIGS. 4A, 4B and 6, the outer part 160 defines an aperture 162 (best seen in FIG. 6) configured to receive the ball bearing 140 and the inner part 120 therein. The outer part 160 also has a retaining skirt 164 (seen in FIG. 6) on a forward side thereof. The retaining skirt 164 projects radially inwardly from the aperture 162, abuts a side of the outer race 144 of the ball bearing 140 and helps in retaining the ball bearing 140 within the aperture 162. The outer part 162 also defines a retaining tab 166 that projects radially outward. The retaining tab 166 defines a retaining tab aperture 168 that is configured to connect to the bungee cord 200.

Referring back FIGS. 1, 2 4A and 4B, as previously described the bungee cord 200 connects the drill bit connector 110 to the drill 60. It is contemplated that the bungee cord 200 could be any other type of line, such as for instance a chain, a wire or a cable. The bungee cord 200 has a drill bit connecting end 202 and a drill connecting end 204. The drill bit connecting end 202 is connected to the retaining tab 166 by being received in the retaining tab aperture 168. It is contemplated that in some embodiments, the drill bit connecting end 202 could connect to the retaining tab 166 without the retaining tab aperture 168. It is also contemplated that the drill bit connecting end 202 could be connected to the retaining tab 166 via a connector such as a split keyring. The drill connecting end 204 is configured to connect to the handle grip 64 of the drill 60. The drill connecting end 204 is connected to a split keyring 206, which in turn is connected to a secondary bungee cord 210 disposed around the handle grip 64. It is understood that in some embodiments, the drill connecting end 204 could be directly connected to the handle grip 64. It is also contemplated that in some embodiments, the drill connecting end 204 could be configured to connect to a holding member. The holding member could be, for example, a belt of an operator of the tool 60, or a wrist of an operator of the tool 60.

Figure 7:
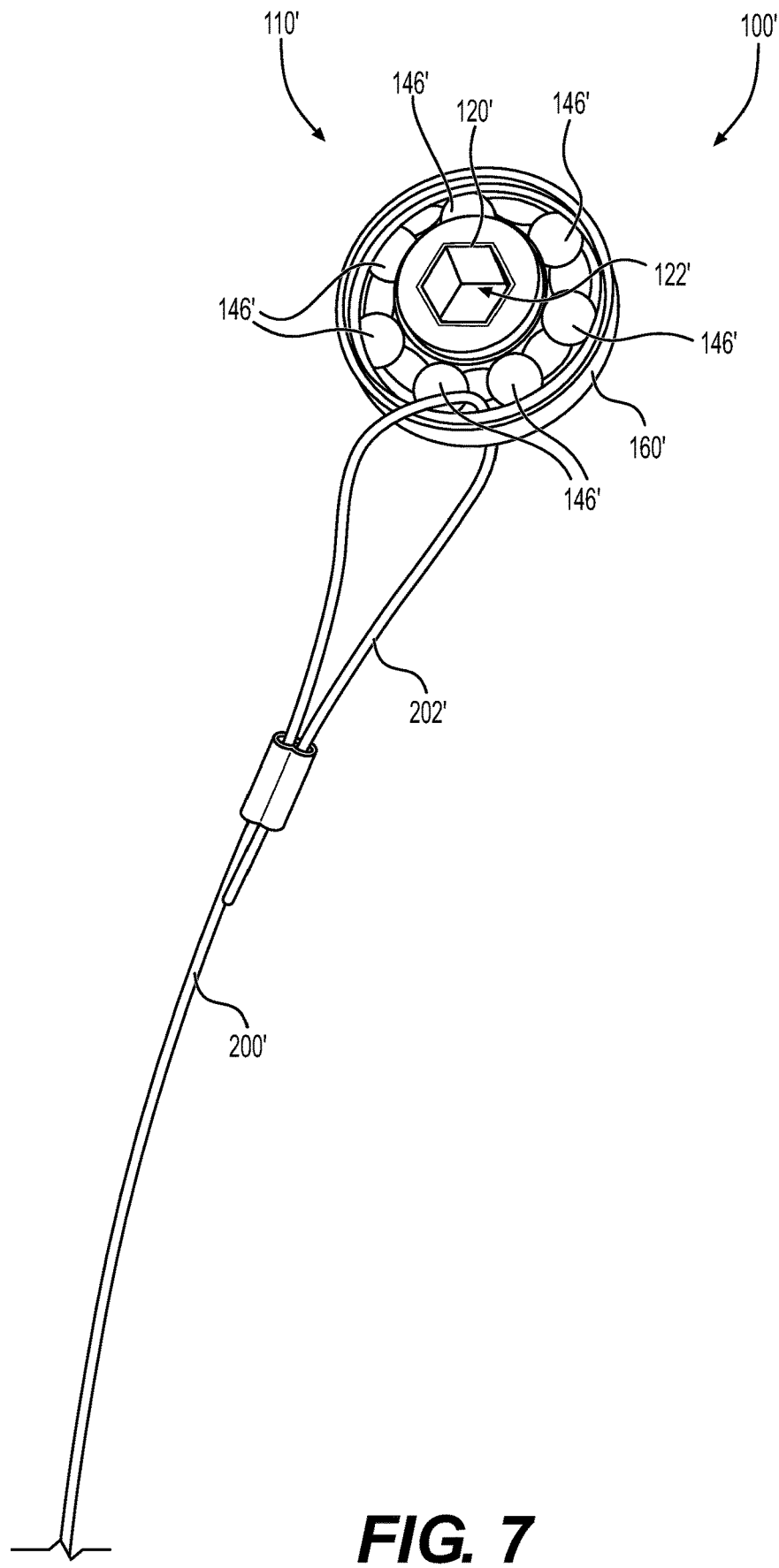
FIG. 7 is a perspective view taken from a bottom, rear, right side of an alternative embodiment of the drill bit attachment assembly of FIG. 3.

Referring now to FIG. 7, an alternative embodiment of the present technology will be described. In this alternate embodiment, the drill bit attachment assembly 100' includes a drill bit connector 110' and a metallic wire 200', which replaces the bungee cord 200 described above. The drill bit connector 110' includes an inner part 120' which defines a connecting aperture 122', an outer part 160', and a plurality of rolling elements 146', which are balls in this embodiment. The plurality of rolling elements 146' are disposed radially between the inner and outer parts 120', 160'. A drill bit connecting end 202' of the metallic wire 200' is connected to the outer part 160' and passes between two of the rolling elements 146'.

Referring back to FIG. 1, a method of using the present technology will now be described with reference to the drill bit attachment assembly 100. Again, as the drill bit attachment assemblies 100, 101, 102 are similar, only the drill bit attachment assembly 100 in operation will be described in detail.

The drill bit attachment assembly 100 is first assembled by connecting the drill bit connecting end 202 of the bungee cord 200 to the retaining tab 166 of the drill bit connector 110, through the retaining tab aperture 168. Then, the drill assembly 50 is assembled, by connecting the drill connecting end 204 to the handle grip 64.

The drill bit attachment assembly 100 is then connected to the drill bit 90. In this instance, a portion of the drill bit 90, the shank 94, the neck 96 and a portion of the body 98, is received in the connecting aperture 122, until the drill bit connector 110 is sufficiently spaced from the shank 94 end of the drill bit 90. Thus, when the drill bit 90 is operatively connected to the chuck 70, the drill bit attachment assembly 100 is spaced from the chuck 70.

Due to the hexagonal shape of the connecting aperture 126 and the hexagonal shape of the drill bit 90, the inner part 120 is rotationally fixed relative to the drill bit 90. Thus, if the drill bit 90 rotates, so does the inner part 140, and vice versa. It is contemplated that in other embodiments, the inner part 120 could be rotationally fixed to the drill bit 90 by another method, such as for instance by friction. The connecting aperture 122 is configured such that when the drill bit 90 is inserted in the connecting aperture 122, there is sufficient friction between the sides of the connecting aperture 122 and the drill bit 90 to prevent the drill bit 90 from falling out of the inner part 120, while still allowing the drill bit 122 to be inserted in and removed from the containing aperture 122 without the use of tools. In some embodiments, the inner part 120 could be removed from the drill bit connector 110, and replaced with another, new inner part 120. This can be useful when the inner part 120 has worn, such that there no longer is sufficient friction between the sides of the connecting aperture 122 and the drill bit 122.

When the same is done for the drill bit attachment assemblies 101, 102, the drill bit attachment assemblies 100, 101, 102 hang from the handle grip 64 by the bungee cord 200 of the corresponding drill bit attachment assemblies 100, 101, 102. The lower portion 65 of the handle grip 64 being wider than the remaining of the handle grip 64 prevents the secondary bungee cords 210 from slipping off the drill 60. It is understood that the drill bit attachment assembly is connectable to a variety of drills. For instance, it is contemplated that in embodiments where the drill 60 does not have the wider lower portion 65, the bungee cords 210 and/or the bungie cord 200 could be configured to not slip off the drill 60.

Referring to FIG. 2, the drill bit 91 is operatively connected to the chuck 70. Thus, in response to the control trigger 68 being actuated, the chuck 70 rotates, and the drill bit 91 rotates with the chuck 70, and in response to the drill bit 91 rotating, the inner part 120 and the inner race 142 of the drill bit connector 160 rotate with the drill bit 91. Thus, the drill bit 91, the inner part 120 and the inner race 142 all rotate relative to the outer part 160. The outer part 160 remains generally stationary. As such, the bungee cord 200 does not wrap around the drill 60 as the drill bit 91 rotates.

When the drill bit 91 is no longer required, the drill bit 91 can be operatively disconnected from the chuck 70, and then dropped, such that the drill bit 91 with its drill bit connector 110 hang from the handle grip 64. Another one of the drill bits 90, 92 can quickly be operatively connected to the chuck 70, without having the need to first store the drill bit 91. This helps prevent dropping the drill bits 90, 91, 92 while they are being changed.

Referring to FIGS. 8 to 14, an alternative embodiment of the present technology, namely drill bit connector 210, will now be described. The drill bit connector 210 includes an inner part 220, an outer part 260, a bearing 240 disposed radially between the inner and outer parts 220, 260 and a retainer 280. Features of the drill bit connector 210 that are similar to features of the drill bit connector 110 have been labelled with the same reference numerals, and will not be described in detail again herewith.

Figure 9:
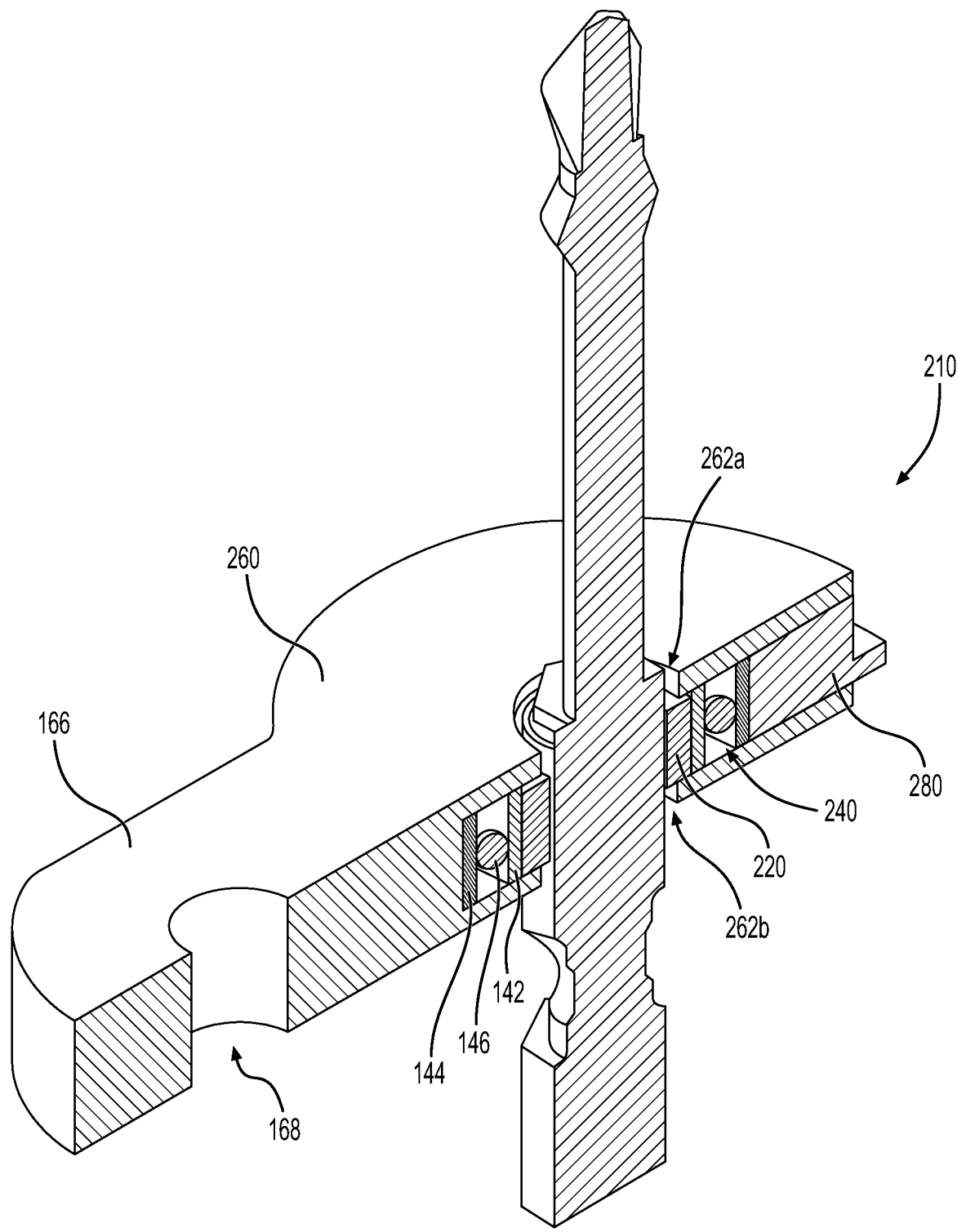
FIG. 9 is a cross-sectional view taken across the plane 9-9 of FIG. 8 of the drill bit connector of FIG. 8.
Figure 12:
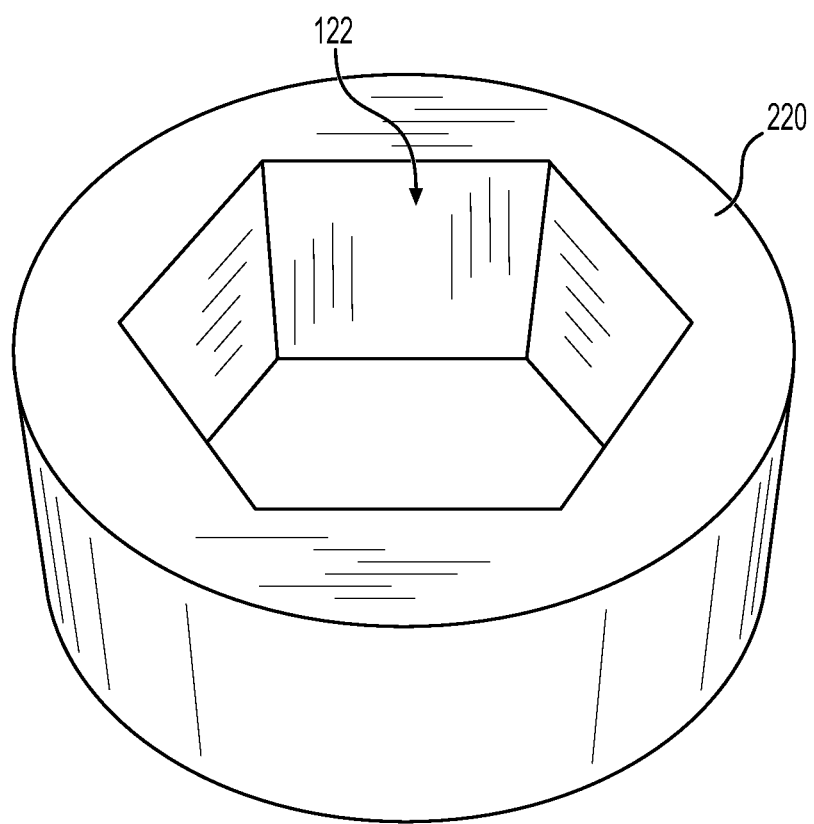
FIG. 12 is a perspective view taken from a top, front side of an inner part of the drill bit connector of FIG. 8.

Referring to FIGS. 9 and 12, the inner part 220 is similar to the inner part 120, with a notable difference being that the inner part 220 does not have a radially extending collar. It is contemplated, however, that in some embodiments, the inner part 220 could have radially extending collars on the front and rear sides thereof. The inner part 220 defines the connecting aperture 122.

Referring to FIG. 9, the bearing 240 is configured to surround the inner part 220, and includes the inner race 142, the outer race 144 and the plurality of rolling elements 146 which are disposed radially between the inner and outer race 142, 144.

Figure 10:
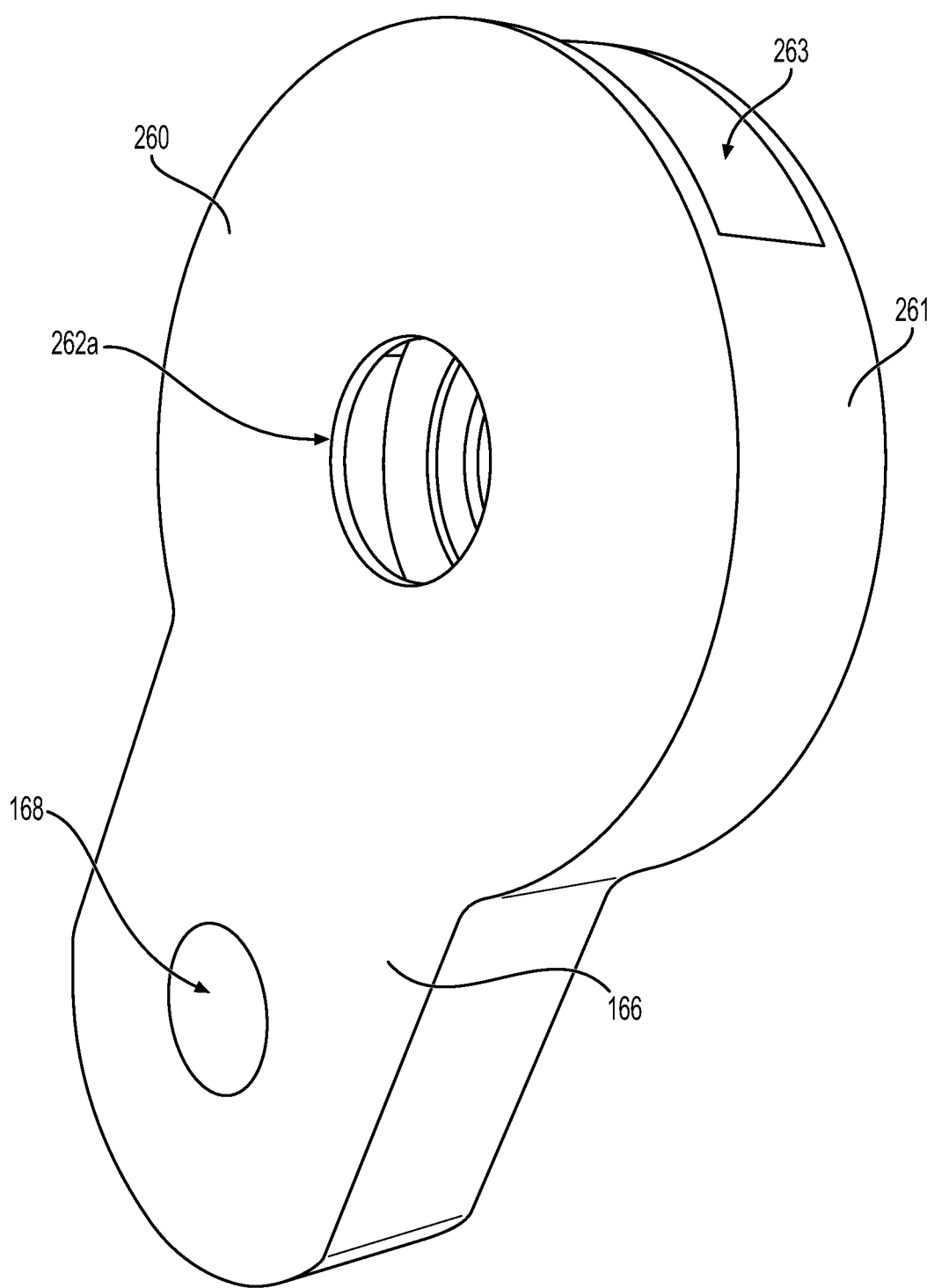
FIG. 10 is a perspective view taken from a top, front, left side of an outer part of the drill bit connector of FIG. 8.
Figure 11:
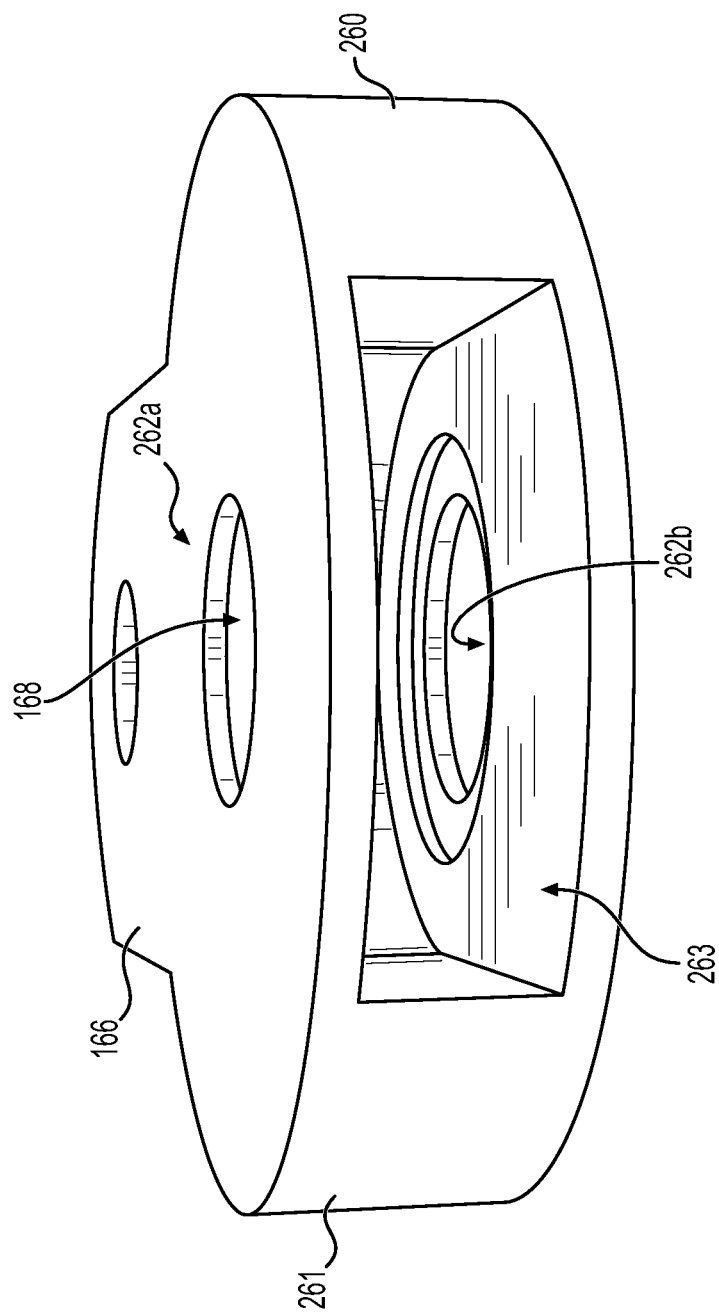
FIG. 11 is a perspective view taken from a top, front side of the outer part of FIG. 10.

Turning to FIGS. 10 and 11, the overall shape of the outer part 260 is similar to the overall shape of the outer part 160, such that the outer part 260, like the outer part 160, has the retaining tab 166 which defines the retaining tab aperture 168. The outer part 260 has a housing portion 261 above the retaining tab 166. The housing portion 261 defines, generally at a center thereof, front and rear apertures 262a, 262b configured to receive a portion of a drill bit therethrough. In some embodiments, the front and rear aperture 262a, 262b could be offset from the center of the housing portion 261. The front and rear apertures 262a, 262b are circular and slightly larger than the connecting aperture 122. The housing portion 261 further defines a recess 263 that extends from a top of the housing portion 261 vertically downward. A bottom of the recess 263 is proximate to a top of the retaining tab 166 (i.e., recess 263 extends below the front and rear apertures 262a, 262b). A bottom of the recess 263 is arcuate, and is complementary to the outer race 144 of the bearing 240 (i.e., the radius of curvature of the bottom of the recess 263 is the same as the radius of curvature of the outer race 144). As will be described below, the recess 263 is configured to receive the inner part 220, the bearing 240 and the retainer 280 therein.

Figure 8:
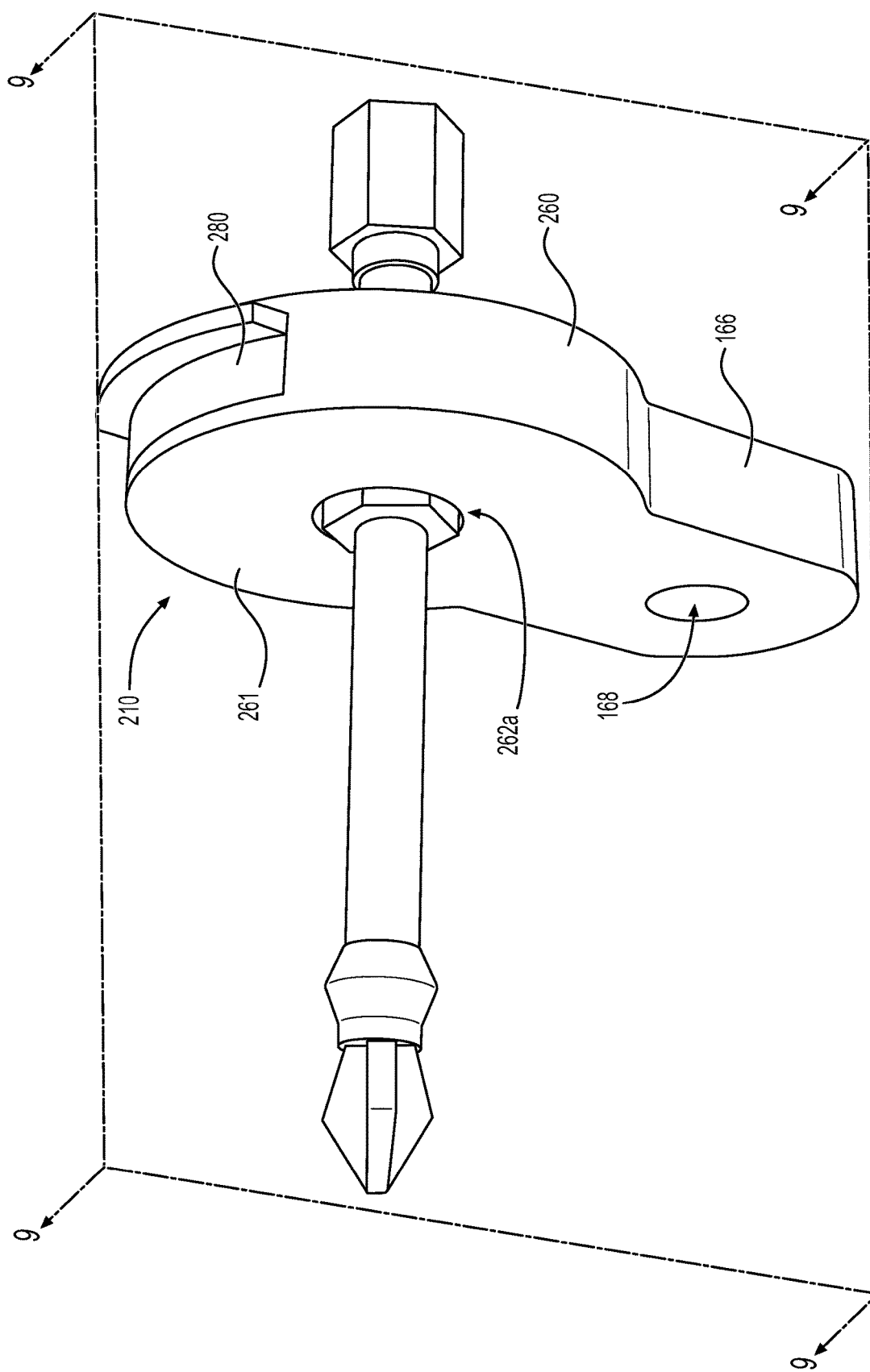
FIG. 8 is a perspective view taken from a top, front, left side of an alternative embodiment of the drill bit connector of FIG. 4B.
Figure 13:
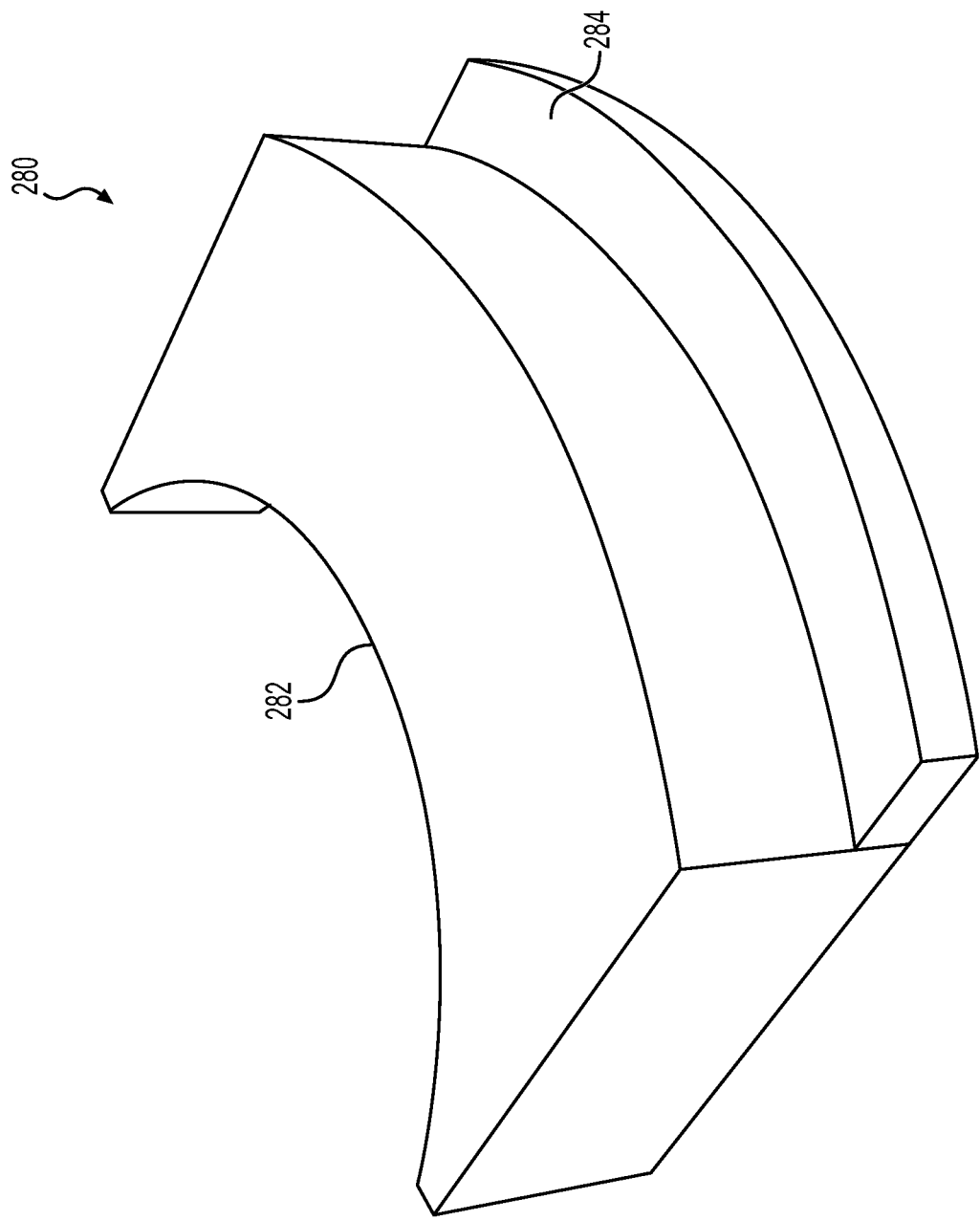
FIG. 13 is a perspective view taken from a top, front, left side of a retainer of the drill bit connector of FIG. 8.
Figure 14:
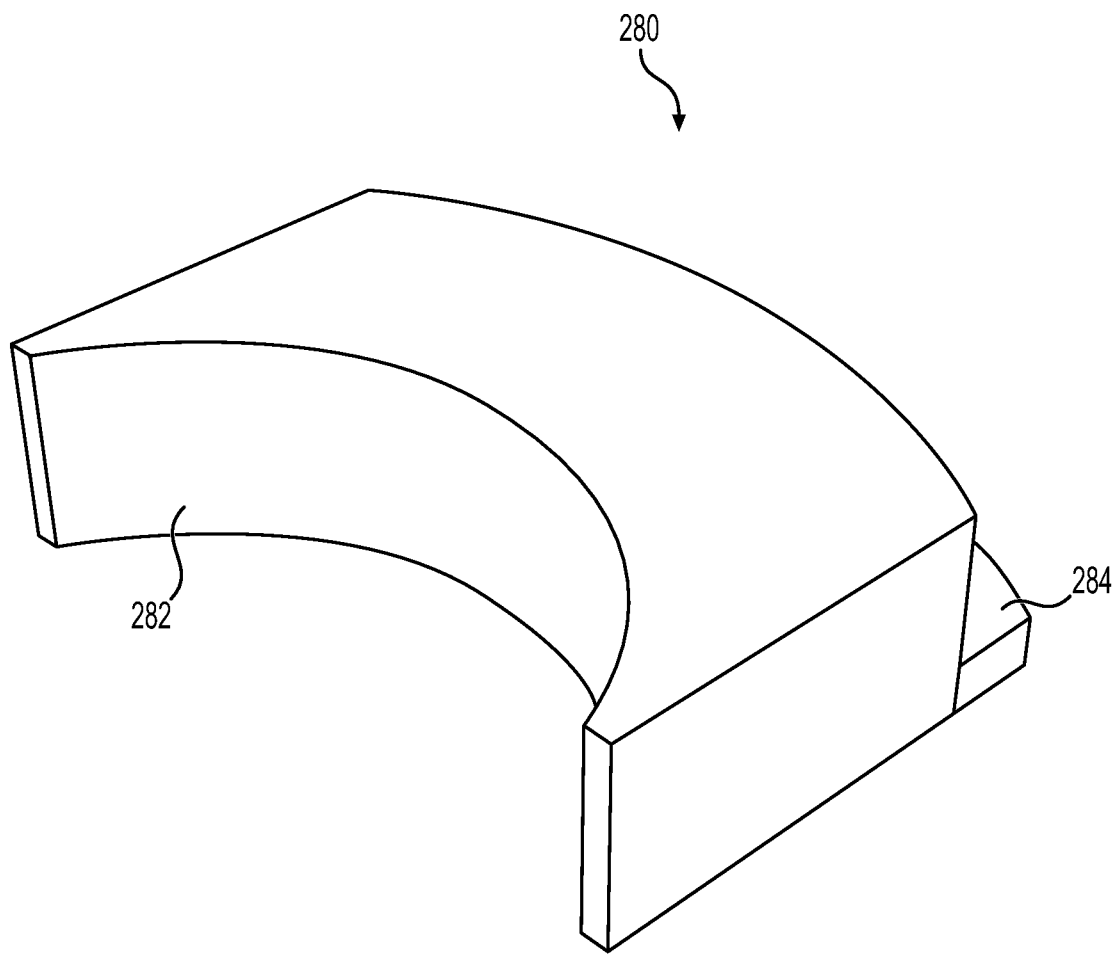
FIG. 14 is a perspective view taken from a bottom, front, left side of the retainer of FIG. 13.

Referring to FIGS. 8, 13 and 14, the retainer 280, as mentioned above, is sized to be snugly received in the recess 263. The retainer 280 has an arcuate lower section 282 configured to engage the bearing 240. The arcuate lower section 282 is complementary to the outer race 144 of the bearing 240 (i.e., the radius of curvature of the arcuate lower section 282 is the same as the radius of curvature of the outer race 144). At a top of the retainer 280, the retainer 280 has a handling tab 284. The handling tab 284 facilitates removal of the retainer 280 from the housing portion 261. It is contemplated that the handling tab 284 could be shaped and/or sized differently. The retainer 280 is made of rubber. It is contemplated that in other embodiments, the retainer 280 could be made of other elastic materials that have a sufficient friction when engaging with the outer race 144 of the bearing 240 so that the retainer 280 rotationally fixes the outer race 144. Additionally, the elastic material of the retainer 280 also has sufficient friction when engaging with walls of the recess 263 so that the retainer 280 does not slip out of the recess 263.

Referring back to FIGS. 8 and 9, to assemble the drill bit connector 210, the inner part 220 is first disposed within the bearing 240. As such, the inner race 142 of the bearing 240 is disposed around the inner part 220. As described above, the inner race 142 of the bearing 240 is rotationally fixed to the inner part 220. The inner part 220 and the bearing 240 are then disposed inside the outer part 260 by being received in the recess 263. The inner part 220 and the bearing 240 are configured so that upon being received within the recess 263, a bottom of the outer race 144 of the bearing 240 engages a bottom of the recess 263, and the connecting aperture 122 of the inner part 220 is generally aligned with the front and rear apertures 262a, 262b. The bottom of the recess 263 being arcuate can help to stabilize the bearing 240 when the bearing 240 is disposed in the recess 263. Then, the retainer 280 is received in the recess 263, thereby "closing" the recess 263. Being that the retainer 280 is configured to be snugly received in the recess 263, it may be required to push the retainer 280 in the recess 263 with some force. Eventually, the arcuate lower section 282 engages a top of the outer race 144 of the bearing 240. Being that the material of the retainer 280 is selected to have relatively high friction with the material of the outer race 144, the outer race 144 is generally fixed relative to the retainer 280. Additionally, the snug fit of the retainer 280 in the recess 263, along with the friction between the retainer 280 and the walls of the recess 263, help to keep the retainer 280 generally fixed in the recess 263 (i.e., the retainer 280 does not slip out). Although not shown in FIGS. 8 and 9, a bungee cord, or another type of line, could be connected to the outer part 260 through the retaining tab aperture 168.

Thus, the inner part 220 is rotationally connected to the outer part 260. More precisely, the bearing 240 rotationally connects the inner part 220 to the outer part 260. A drill bit can then be received through the rear aperture 262b, through the connecting aperture 122 and through the front aperture 262a. Similarly to the above embodiments, the inner part 220 is configured to be rotationally fixed relative to the drill bit that is received through the connecting aperture 122.

If there is a need to disassemble the drill bit connector 210, after removing the drill bit from the front, connecting and rear apertures 262a, 122, 262b, an operator pulls on the handling tab 284 of the retainer 280 to easily remove the retainer 280 from the recess 263, and then remove the bearing 240 and the inner part 220.

The method of using the drill bit connector 210 is similar to the method described hereabove with reference to the drill bit connector 110, and thus will not be described in detail again.

Modifications and improvements to the above-described embodiments of the present invention may become apparent to those skilled in the art. The foregoing description is intended to be exemplary rather than limiting. The scope of the present invention is therefore intended to be limited solely by the appended claims.

What is claimed is:

1. A tool part attachment assembly for a tool, the tool part attachment assembly comprising:
    a tool part connector configured for selectively retaining a tool part, the tool part connector comprising:
        a first part defining a connecting aperture configured to receive a portion of the tool part, the first part being rotationally fixed relative to the tool part when the tool part is received in the connecting aperture;
        a second part rotationally connected to the first part, the first part being disposed inside the second part;
        a bearing disposed radially between the first and second parts, the bearing comprising:
            an inner race;
            an outer race; and
            a plurality of rolling elements disposed radially between the inner and outer races,
        the second part having a housing portion defining a recess configured to receive the first part and the bearing therein; and
        a retainer received in the recess and configured to retain the first part and the bearing within the recess; and
    a line comprising:
        a first end connected to the tool part connector; and
        a second end,
    in response to the tool part rotating, the first part rotating with the tool part relative to the second part.

2. The tool part attachment assembly of claim 1, wherein the bearing is a ball bearing.

3. The tool part attachment assembly of claim 1, wherein the retainer is made of elastic material.

4. The tool part attachment assembly of claim 1, wherein the second part defines a retaining tab connected to the first end of the line.

5. The tool part attachment of claim 1, wherein the second end of the line is configured for connection to at least one of:
    a handle grip of the tool, for connecting the tool part attachment assembly and the tool part to the tool, and
    a holding member, for connecting the tool part attachment assembly and the tool part to the holding member.

6. The tool part attachment assembly of claim 1, wherein the connecting aperture has a hexagonal shape.

7. The tool part attachment assembly of claim 1, wherein the recess extends radially in the housing portion from a periphery thereof, and with the retainer received in the recess, the retainer abuts the outer race of the bearing.

8. A tool part connector for a tool, the tool part connector being configured for selectively retaining a tool part, the tool part connector comprising:
    a first part defining a connecting aperture configured to receive a portion of the tool part, the first part being rotationally fixed relative to the tool part when the tool part is received in the connecting aperture;
    a second part rotationally connected to the first part, the first part being disposed inside the second part;

a bearing disposed radially between the first and second parts, the bearing comprising:
  an inner race;
  an outer race; and
  a plurality of rolling elements disposed radially between the inner and outer races,
the second part having a housing portion defining a recess configured to receive the first part and the bearing therein; and
a retainer received in the recess and configured to retain the first part and the bearing within the recess,
in response to the tool part rotating, the first part rotating with the tool part relative to the second part.

9. The tool part connector of claim 8, wherein the bearing is a ball bearing.

10. The tool part connector of claim 8, wherein the retainer is made of elastic material.

11. The tool part connector of claim 8, wherein the second part defines a retaining tab connectable to a first end of a line.

12. The tool part connector of claim 8, wherein the connecting aperture has a hexagonal shape.

13. The tool part connector of claim 8, wherein the recess extends radially in the housing portion from a periphery thereof, and with the retainer received in the recess, the retainer abuts the outer race of the bearing.

14. A tool assembly comprising:
  a tool having a handle grip and a chuck;
  at least one tool bit operatively selectively connected to the chuck; and
  at least one tool bit attachment assembly connected to the at least one tool bit, the at least one tool bit attachment assembly comprising:
    a tool bit connector selectively retaining the at least one tool bit, the tool bit connector comprising:
      a first part defining a connecting aperture receiving a portion of the at least one tool bit, the first part being rotationally fixed relative to the at least one tool bit;
      a second part rotationally connected to the first part, the first part being disposed inside the second part;
      a bearing disposed radially between the first and second parts, the bearing comprising:
        an inner race;
        an outer race; and
        a plurality of rolling elements disposed radially between the inner and outer races,
      the second part having a housing portion defining a recess configured to receive the first part and the bearing therein; and
      a retainer received in the recess and configured to retain the first part and the bearing within the recess; and
    a line comprising:
      a first end connected to the tool bit connector; and
      a second end,
    in response to the at least one tool bit rotating with the chuck, the first part rotating with the at least one tool bit relative to the second part.

15. The tool assembly of claim 14, wherein the recess extends radially in the housing portion from a periphery thereof, and with the retainer received in the recess, the retainer abuts the outer race of the bearing.

* * * * *